(12) United States Patent
Sartini et al.

(10) Patent No.: US 8,125,328 B2
(45) Date of Patent: Feb. 28, 2012

(54) SYSTEM AND METHOD FOR PROVIDING MANAGED REMOTE MONITORING SERVICES

(75) Inventors: Robert A. Sartini, Colorado Springs, CO (US); Paul T. Schultz, Colorado Springs, CO (US); Martin W. McKee, Herndon, VA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 361 days.

(21) Appl. No.: 12/389,980

(22) Filed: Feb. 20, 2009

(65) Prior Publication Data

US 2010/0214090 A1    Aug. 26, 2010

(51) Int. Cl.
*G08B 23/00* (2006.01)

(52) U.S. Cl. .................................. 340/517; 379/201.02

(58) Field of Classification Search .................. 340/517, 340/870.01, 426.18; 370/466; 709/203, 709/217; 379/201.02
See application file for complete search history.

(56) References Cited

U.S. PATENT DOCUMENTS

| | | | |
|---|---|---|---|
| 6,421,354 B1 * | 7/2002 | Godlewski | 370/466 |
| 6,847,892 B2 * | 1/2005 | Zhou et al. | 701/213 |
| 7,202,814 B2 * | 4/2007 | Caspi et al. | 342/357.35 |
| 7,466,810 B1 * | 12/2008 | Quon et al. | 379/201.01 |
| 7,650,337 B2 * | 1/2010 | Cox | 707/783 |

* cited by examiner

*Primary Examiner* — John A Tweel, Jr.

(57) ABSTRACT

An approach is provided for a managed heterogeneous sensor service. A plurality of signals are received over a communication network from, respectively, a plurality of heterogeneous sensors. A plurality of instant communication sessions are established over the communication network corresponding to each of the sensors. Presence of each of the sensors is indicated over the instant communication sessions. Sensor data is generated in response to the received signals. The sensor data is transmitted over the corresponding instant communication sessions.

23 Claims, 11 Drawing Sheets

Normal

Flooding

Freezing

SYSTEM AND METHOD FOR PROVIDING MANAGED REMOTE MONITORING SERVICES

BACKGROUND INFORMATION

With the advent of computers, interactive electronic communications, and the Internet, as well as advances in the digital realm of consumer information, has come a reinvention of conventional techniques for remotely monitoring consumer assets, environments, locations, processes, and the like. Traditionally, remote monitoring techniques have been limited to specific monitoring networks, such as dedicated security system networks that are particularly designed to determine whether or not an intruder has entered an unauthorized space. However, with readily available, cost-effective broadband services, bandwidth intensive applications, and reductions in cost of computing equipment, new more advanced techniques for remote monitoring are desired.

Furthermore, telecommunication service providers are finding it increasingly more challenging to leverage their existing resources. Yet, as increasing numbers of individuals migrate from the use of traditional communications based technologies to synergistic multimedia platforms, traditional telecommunications service providers are being challenged to develop new services and features in order to remain competitive, as well as develop new sources of revenue to support their aging infrastructures. One relatively untapped market for telecommunication service providers is that of instant communication services.

Therefore, there is a need for an approach that provides more effective and convenient techniques to providing managed remote monitoring services that also enable telecommunication service providers to generate new sources of revenue through existing technologies.

BRIEF DESCRIPTION OF THE DRAWINGS

Various exemplary embodiments are illustrated by way of example, and not by way of limitation, in the figures of the accompanying drawings in which like reference numerals refer to similar elements and in which.

DESCRIPTION OF THE PREFERRED EMBODIMENT

A preferred apparatus, method, and software for providing remote monitoring services are described. In the following description, for the purposes of explanation, numerous specific details are set forth in order to provide a thorough understanding of the preferred embodiments of the invention. It is apparent, however, that the preferred embodiments may be practiced without these specific details or with an equivalent arrangement. In other instances, well-known structures and devices are shown in block diagram form in order to avoid unnecessarily obscuring the preferred embodiments of the invention.

Figure 1:
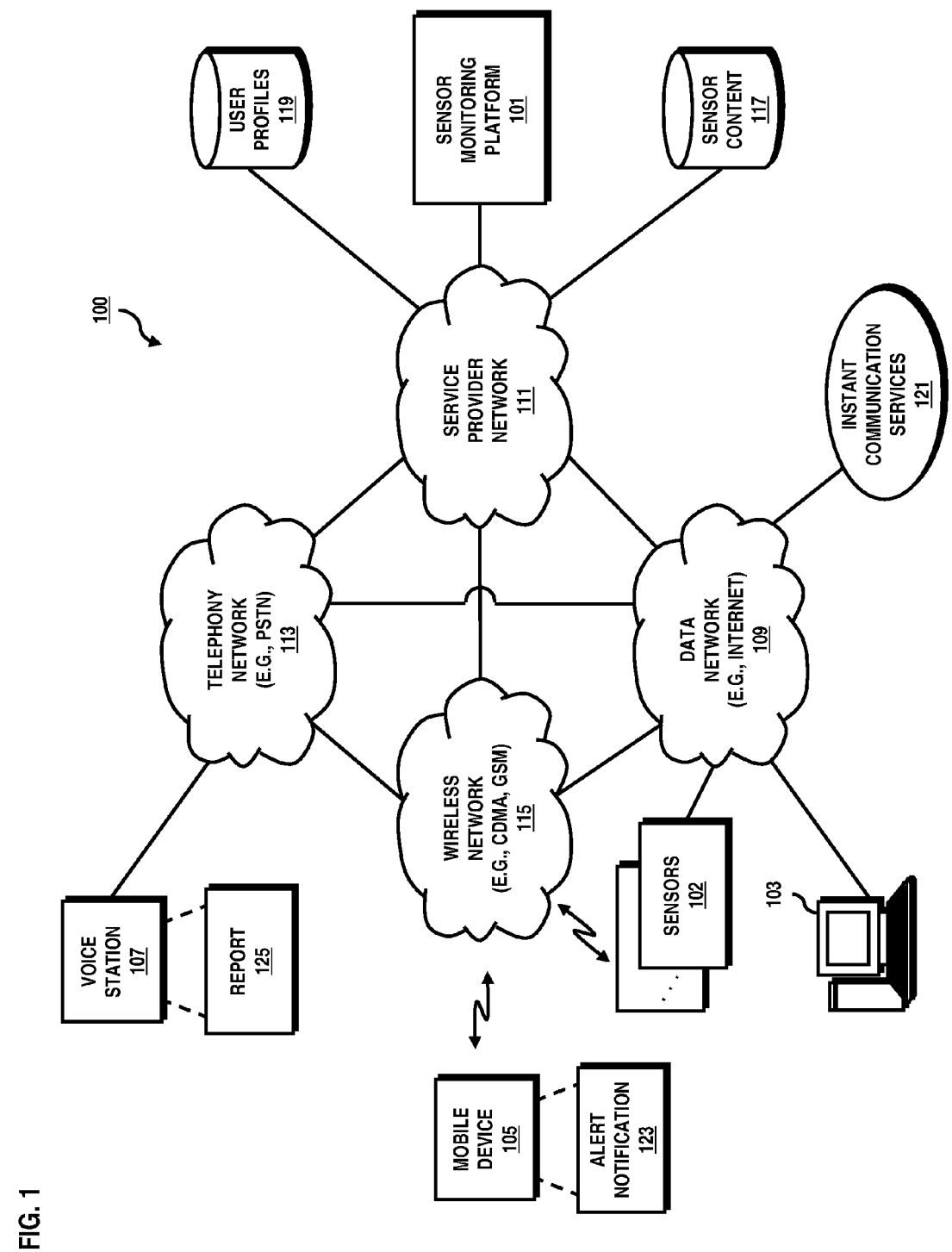
FIG. 1 is a diagram of system capable of providing managed remote monitoring services, according to an exemplary embodiment.

FIG. 1 is a diagram of a system capable of providing managed remote monitoring services, according to an exemplary embodiment. For the purposes of illustration, system 100 is described with respect to sensor monitoring platform 101 configured to consolidate and converge sensor information (or data) received from a plurality of heterogeneous sensors 102 associated with, for example, one or more assets, environments, locations, processes, etc. In exemplary embodiments, system 100 enables end users at one or more end-devices (e.g., computing device 103, mobile device 105, and/or voice station 107) to receive customizable presentations of sensor information and alert notifications associated with one or more sensed conditions, as well as specify criteria for the generation and reception of the customizable sensor information and alert notifications. According to certain other embodiments, end users may interact with the heterogeneous sensors 102 of system 100 either directly via a user interface of the heterogeneous sensors 102 or indirectly via a virtual user interface provided by sensor monitoring platform 101. In this manner, the managed sensor services of system 100 may be network-coordinated via sensor monitoring platform 101 and/or coordinated by respective heterogeneous sensors 102. While specific reference will be made hereto, it is contemplated that system 100 may embody many forms and include multiple and/or alternative components and facilities.

It is observed that remote monitoring systems offer users (or consumers) great convenience, in terms of mobility. That is, consumers are consistently looking for new and more efficient techniques to remotely inform themselves as to the "current" state or status of their assets, environments, locations, processes, etc., as well as receive alert notifications when problematic situations arise. Meanwhile, traditional telecommunication service providers have been consistently looking for new ways to leverage their existing infrastructures, such as instant communication service infrastructures, in the support of new services and sources of revenue.

Therefore, the approach according to certain embodiments of system 100 stems from the recognition that effectuating managed remote monitoring services across multiple modes of existing communications and networks, provides an efficient technique to consolidate and converge various types of sensor information, provide customizable presentations of sensor information and alert notifications associated with one or more sensed conditions, and enable end users to specify criteria for receiving customizable notifications and alert notifications, as well as permit end user interactivity with the heterogeneous sensors 102 and facilitate end user remote supervision of their assets, environments, locations, processes, etc.

According to exemplary embodiments, sensor monitoring platform 101 may be configured to consolidate and converge various types of sensor information (or data) corresponding to one or more heterogeneous sensors 102 associated with, for example, one or more end-user assets, environments, locations, processes, etc., hereinafter, collectively referred to as end-user environments. In this manner, sensor monitoring platform 101 may receive a plurality of signals over one or more communication networks (e.g., data network 109, service provider network 111, telephony network 113, and/or wireless network 115) from, respectively, a plurality of heterogeneous sensors 102 associated with the end-user environments. These signals may relate to one or more sensed conditions of (or inputs to) heterogeneous sensors 102; and, therefore, sensor monitoring platform 101 may be further configured to generate sensor information in response to the received signals. To this effect, received signals and/or generated sensor information may relate to real-time information, historical information, or a combination thereof. Further, it is noted that received signals and/or generated sensor information may be stored to, for example, sensor content repository 117; however, it is also contemplated that this information may be stored, additionally or alternatively, to any other suitable storage location of system 100, such as user profiles repository 119, or a memory of sensor monitoring platform 101, end-user devices 103-107, or the heterogeneous sensors 102, themselves.

In particular embodiments, sensor monitoring platform 101 may utilize information stored within sensor content repository 117 and/or user profiles repository 119 to generate one or more alert notifications 123 or reports 125 for conveying sensor information to end-users at end-user devices 103-107. For instance, end-users may specify various criteria for instructing sensor monitoring platform 101 on "how," "when," and "in what form" to generate and transmit alert notifications 123 or reports 125 to select end-users at select end-user devices 103-107.

With respect to alert notifications 123, sensor monitoring platform 101 may correlate "currently" sensed conditions of respective heterogeneous sensors 102 with various end-user specified criteria, such as a threshold parameter or range of threshold parameters. As such, when certain "currently" sensed conditions exhibit specified relationships with the threshold(s), then sensor monitoring platform 101 may be further configured to generate one or more customized alert notifications 123 for conveying the "currently" sensed conditions to specified end-users at specified end-user devices 103-107. For example, an end-user may specify various criteria for causing sensor monitoring platform 101 to establish a voice call with voice end-user device 107 when a "current" ambient temperature within a home of the end-user falls below 50° F. It is also noted that alert notifications 123 may be provided in the form of presence information, such as rich presence information, and/or alert notification presence icons, as will become more apparent in the description of FIGS. 2 and 6-9C. Accordingly, end-users may be permitted to obtain customizable alert notifications 123 by providing generation and transmission criteria, which may be stored to, for example, user profiles repository 119, or any other suitable storage location of system 100.

In regard to reports 125, sensor monitoring platform 101 may be configured to receive report requests, from end-user devices 103-107, for generating reports 125 based on the sensor information. According to particular embodiments, the report requests may include end-user specified criteria for generating reports 125. As such, sensor monitoring platform 101 may be further configured to generate reports 125, in response to the report requests, as well as based on the criteria specified in the report requests. In other instances, the criteria may have been previously specified by end-users and, thereby, stored to, for example, user profiles repository 119. The reports may include various audio (e.g., sounds, "earcons" (i.e., audio icons), voices, etc.), visual (e.g., charts, graphs, suggestions, textual explanations, warnings, etc.), and/or haptic (e.g., tactile feedback, etc.) information. Generation of reports based on report requests is explained in more detail in accordance with FIGS. 2 and 5. Accordingly, end-users may be permitted to obtain customizable reports 125 by providing generation and transmission criteria, which may be stored to, for example, user profiles repository 119, or any other suitable storage location of system 100, as well as specified in one or more report requests.

According to various exemplary embodiments, the managed remote monitoring services of system 100 may be provided via sensor monitoring platform 101 and/or via heterogeneous sensors 102 of system 100. This approach will become more apparent based on the respective descriptions of FIGS. 2 and 11, as well as the explanations of FIGS. 3-7.

Nevertheless, service provider network 111 enables end-user devices 103-107 to access the managed remote monitoring services (or functionality) of sensor monitoring platform 101 via networks 109-115. Networks 109-115 may be any suitable wireline and/or wireless network. For example, telephony network 113 may include a circuit-switched network, such as the public switched telephone network (PSTN), an integrated services digital network (ISDN), a private branch exchange (PBX), or other like network. Wireless network 115 may employ various technologies including, for example, code division multiple access (CDMA), enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE), wireless fidelity (WiFi), satellite, and the like. Data network 109 may be any local area network (LAN), metropolitan area network (MAN), wide area network (WAN), the Internet, or any other suitable packet-switched network, such as a commercially owned, proprietary packet-switched network having voice over internet protocol (VoIP) capabilities, e.g., a proprietary cable or fiber-optic network.

Although depicted as separate entities, networks 109-115 may be completely or partially contained within one another, or may embody one or more of the aforementioned infrastructures. For instance, service provider network 111 may embody circuit-switched and/or packet-switched networks that include facilities to provide for transport of circuit-switched and/or packet-based communications. It is further contemplated that networks 109-115 may include components and facilities to provide for signaling and/or bearer communications between the various components or facilities of system 100. In this manner, networks 109-115 may embody or include portions of a signaling system 7 (SS7) network, or other suitable infrastructure to support control and signaling functions.

Accordingly, the remote monitoring services of system 100 and/or end-user access of sensor monitoring platform 101 via end-user devices 103-107 may be initiated or performed over one or more of networks 109-115. As such, end-user devices 103-107 may include any customer premise equipment (CPE) capable of sending and/or receiving information over one or more of networks 109-115. For instance, voice end-user device 107 may be any suitable plain old telephone service (POTS) device, facsimile machine, etc., while mobile (or otherwise wireless) end-user device 105 may be any cellular phone, radiophone, satellite phone, smart phone, wireless phone, or any other suitable mobile device, such as a personal digital assistant (PDA), pocket personal computer, tablet, customized hardware, etc. Further, computing end-user device 103 may be any suitable computing device, such as a VoIP phone, skinny client control protocol (SCCP) phone, session initiation protocol (SIP) phone, IP phone, personal computer, softphone, workstation, terminal, server, etc.

It is noted that end-user devices 103-107 may include one or more components for extending media and/or multimedia functionality to end-users. In this manner, end-user devices 103-107 can include one or more client programs that operate thereon for providing access to the managed remote monitoring services of system 100, such as providing access to sensor monitoring platform 101 and/or heterogeneous sensors 102 of system 100. It is contemplated, however, that these client programs may be executed via sensor monitoring platform 101 and/or heterogeneous sensors 102 and, thereby, made accessible to end-users via end-user devices 103-107. According to certain embodiments, these client programs may relate to one or more user interfaces, e.g., graphical user interfaces (GUI), configured to interact with the various services (or functions) of system 100, e.g., requesting and receiving customizable sensor information and alert notifications, specifying criteria for the generation and distribution of customizable sensor information and alert notifications, and/or interacting with heterogeneous sensors 102 of system 100. Additionally, the user interfaces may be configured to facilitate the acquisitioning, exchanging, managing, sharing, storing, and updating of heterogeneous sensor buddy lists, sensor information and/or user profiles among end users (or subscribers) of the remote managed monitoring services of system 100.

In exemplary embodiments, network(s) 109-115 may also provide end-user device 103-107 access to one or more instant communication services 121, such as one or more instant messaging (IM) services. As such, sensor information may be distributed to select end-user devices 103-107 via one or more instant communication sessions. According to particular implementations, sensor information may be distributed in terms of, for example, rich presence information (or states). That is, a currently sensed condition of a particular heterogeneous sensor 102 may be made to correspond to the rich presence of that particular heterogeneous sensor 102. Thus, like a "current" state (or presence) of an end-user logged onto an instant communication service 121 is conveyed to other logged on end-users as, for example, an "away" message, a "currently" sensed condition of a particular heterogeneous sensor 102 may be conveyed to selective end-users at one or more of end-user devices 103-107 as the rich presence of that particular heterogeneous sensor 102.

Accordingly, heterogeneous sensors 102 may be configured to establish instant communication sessions with one or more instant communication services 121 utilizing, for example, one or more instant communication client protocols, such as an extensible messaging and presence protocol (XMPP), a session initiating protocol (SIP), a session initiation protocol for instant messaging and presence leveraging extensions (SIMPLE), and/or any other suitable protocol. Alternatively, heterogeneous sensors 102 may transmit signals corresponding to "currently" sensed conditions to sensor monitoring platform 101, whereby sensor monitoring platform 101 may establish a plurality of instant communication sessions with one or more instant communication services 121 corresponding to respective heterogeneous sensors 102, generate sensor information in response to received signals and, thereby, indicate the presence, e.g., rich presence, of heterogeneous sensors 102 to select end-users at one or more end-user devices 103-107 over the corresponding instant communication sessions. It is noted that heterogeneous sensors 102 may be configured to transmit sensor information and/or presence information (e.g., rich presence) to sensor monitoring platform 101 instead of (or in addition to) the signals. In this manner, instant communication services 121 may include a presence server (or module) that acts as one or more "brokers" of presence information, i.e., handlers of consumers of presence (e.g., end-users at end-user devices 103, 105, and 107) and producers of presence (e.g., heterogeneous sensors 102). It is generally noted that one or more consumers of presence (or watchers) may subscribe to the publication of presence (e.g., rich presence information) of one or more producers of presence (or presentities). As such, instant communication services 121 may authorize watchers to receive (or otherwise access) the presence publications of one or more presentities. It is noted that authorization procedures may be performed in conjunction with sensor monitoring platform 101, such as, for example, based on information stored to user profiles repository 119 or any other suitable storage location.

Rich presence is an enhanced form of presence awareness in which participants can determine if other users are online and if so, observe to a limited extent what activities the participants are engaged in and how they are performing the activities. Basic presence services divulge only the availability of another user. By contrast, rich presence provides greater information, whereby subscribers can let others know the following exemplary information: location, whether the device of the participant is mobile, specifications of the device, the device's operating system, local time, personal messages, current employer or client, the level of privacy desired, etc.

It is noted that instant communication services 121 may be managed by a service provider of the managed remote monitoring services of system 100 or by any suitable third-party service provider. While instant communication services 121 are shown accessible via data network 109, it is contemplated that instant communication services 121 may be accessible via any one or more of communication networks 109-115.

To this effect, communication networks 109-115 may enable instant communication sessions to span a diversity of communication channels and, thereby, extend to an assortment of end-user devices 103-107. Accordingly, sensor monitoring platform 101 may also be configured to act as a "principle-broker" or as an "agent-broker" of presence information. That is, sensor monitoring platform 101 may convey presence information, such as rich presence information, like that of instant communication services 121 or may relay such presence information to instant communication services 121 for publication to authorized watchers. According to certain embodiments, sensor monitoring platform 101 may also be configured to combine the presence (such as the rich presence) of a plurality of heterogeneous sensors 102 to provide an aggregated view (or condition) of one or more end-user environments. For example, various sensed conditions may be combined to determine whether a particular end-user environment is "stable," e.g., operating as intended, or "unstable," e.g., one or more sensed conditions are not operating as intended. In this manner, multiple points of presence (MPOP), which may be multiple points of rich presence, of a plurality of heterogeneous sensors 102 may be combined by sensor monitoring platform 101 to distribute aggregated assessments of particular end-user environments, such that when a particular sensed condition(s) becomes "unsuitable," only the particular unsuitable sensed condition(s) need be reported to select end-users at one or more of end devices 103-107. As previously mentioned, aggregated MPOP may also be "brokered" by sensor monitoring platform 101 or may be conveyed to instant messaging services 121 for "brokering." Further, MPOP of end-users at end devices 103-107 may be utilized by sensor monitoring platform 101 to automatically direct the, for example, rich presence of heterogeneous sensors 102 to all or select ones of end-devices 103-107. For example, if a particular end-user is associated with end-user devices 103-107, the rich presence of heterogeneous sensors 102 may be transmitted to each of end-user devices 103-107 or may be transmitted to particular ones of end devices 103-107 based on, for example, the presence (e.g., "away," "do not disturb," "ready for chat," etc.) of the end-user at end-user devices 103-107 and/or criteria stored to one or more user profiles associated with the end-user and corresponding heterogeneous sensors 102. Alternatively (or additionally), instant messaging services 121 may perform this function.

It is further noted that, sensor monitoring platform 101 and/or heterogeneous sensors 102 may, in exemplary embodiments, be configured to transmit sensor information, alert notifications 123 and/or reports 125 via established instant communication sessions associated with respective heterogeneous sensors 102 and one or more end-user devices 103-107.

Accordingly, heterogeneous sensors 102 of system 100 may be configured to remotely monitor a vast assortment of end-user environments. In this manner, and as will become more apparent in the discussion of FIG. 11, heterogeneous sensors 102 may include one or more sensor modules (or transducers) for detecting or otherwise monitoring one or more parameters associated with particular end-user environments. For instance, sensor modules may be configured for detecting parameters, such as thermal parameters (e.g., temperature, heat, etc.), biological parameters (e.g., pheromones, nutrients, cell division, neuron transmission, heart rate, blood pressure, etc.), electromagnetic parameters (e.g., resistance, current, voltage, power, magnetism, metal, radar, etc.), mechanical parameters (e.g., distance, pressure, flow, level, viscosity, density, motion, acceleration, position, occupancy, orientation, stress, state, velocity, etc.), chemical parameters (e.g., acidity, basicity, gas, odor, toxicity, etc.), optical radiation parameters (e.g., light, proximity, focus, interference, wavelength, frequency, etc.), ionizing radiation parameters (e.g., radiation, subatomic particles, etc.), acoustic parameters (e.g., sounds, patterns, tempo, frequency, range, decibel, etc.), networking parameters (e.g., bandwidth, congestion, transmission rate, reception rate, etc.), and the like. Namely, it is contemplated that any detectable parameter, state, or variable may be sensed by one or more of the modules of a heterogeneous sensor 102 of system 100.

Sensor content repository 117 stores sensor content, such as received signals from respective heterogeneous sensors 102, sensor information, sensor data, heterogeneous sensor configuration information, and the like. Sensor profiles repository 117 may include information corresponding to the users (or subscribers) of the managed remote monitoring services (or functionality) of system 100, such as user profile information including generation and transmission criteria, scheduling information, associated heterogeneous sensors 102, associated end-user environments, etc. By way of example, the user profile information may include subscription information (e.g., account numbers, usernames, passwords, security questions, monikers, etc.), subscriber demographics (e.g., age, gender, ethnicity, location of residence, zip code, school district, community, socioeconomic status, religion, marital status, ownerships, languages, mobility, life cycles, etc.), group/organizational affiliations (e.g., political), memberships, interests, system configurations, policies, associated users/devices, etc.

In this manner, repositories 117 and 119 may be maintained by a service provider of the managed remote monitoring services or a suitable third-party. It is further contemplated that the physical implementation of repositories 117 and 119 may take on many forms, including, for example, portions of existing repositories of a service provider, new repositories of a service provider, third-party repositories, and/or shared-repositories. As such, repositories 117 and 119 may be configured for communication over system 100 (e.g., over networks 109-115) through any suitable messaging protocol, such as lightweight directory access protocol (LDAP), extensible markup language (XML), open database connectivity (ODBC), structured query language (SQL), Configuration Access Protocol (CAP) and the like, as well as combinations thereof. In those instances when repositories 117 and 119 are provided in distributed fashions, information and content available via repositories 117 and 119 may be located utilizing any suitable querying technique, such as electronic number matching, distributed universal number discovery (DUNDi), uniform resource identifiers (URI), etc.

Figure 2:
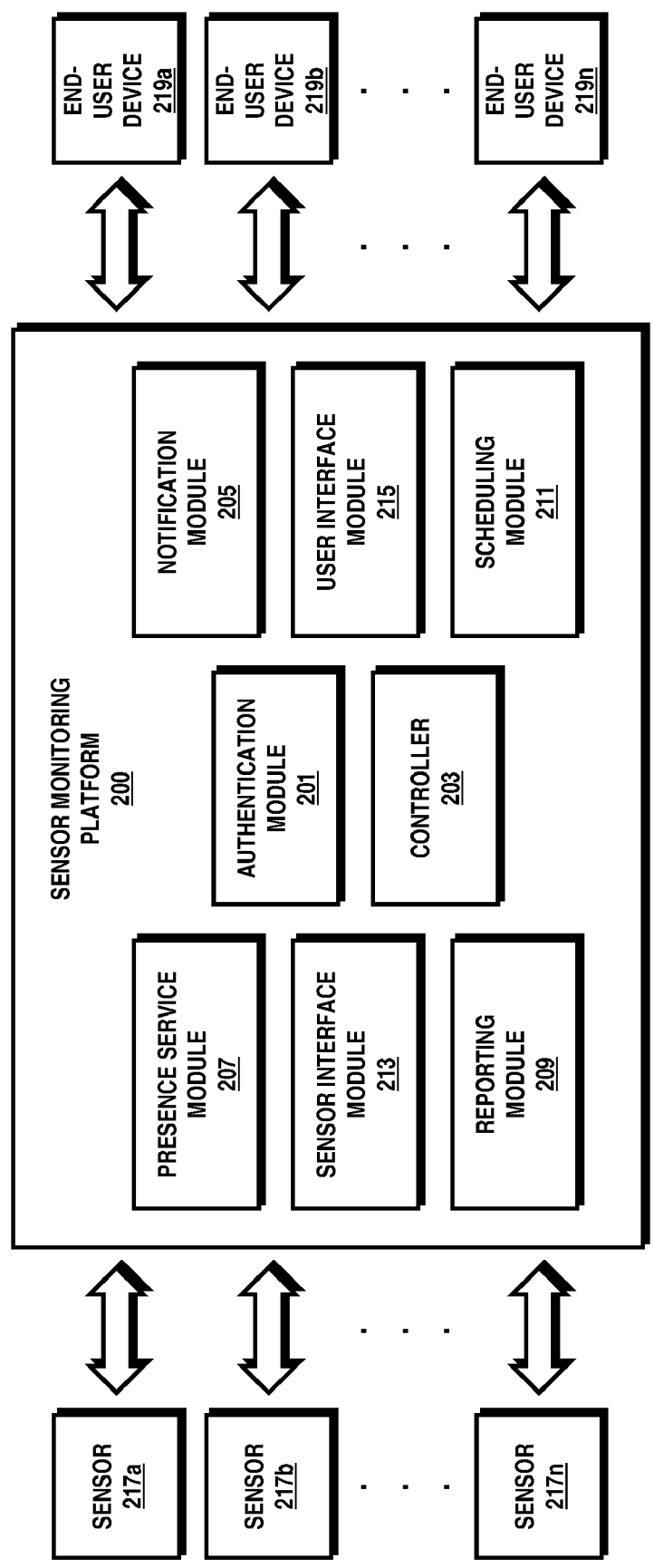
FIG. 2 is a diagram of a sensor monitoring platform configured to provide managed remote monitoring services, according to an exemplary embodiment.

FIG. 2 is a diagram of a sensor monitoring platform configured to provide managed remote monitoring services, according to an exemplary embodiment. Senor monitoring platform (or platform) 200 may comprise computing hardware (such as described with respect to FIG. 12), as well as include one or more components configured to execute the processes described herein. In one implementation, platform 200 includes authentication module 201, controller 203, notification module 205, presence service module 207, reporting module 209, scheduling module 211, sensor interface module 213, and user interface module 215. Platform 200 may also communicate with one or more repositories, such as sensor content repository 117 and user profiles repository 119, as well as communicate with one or more heterogeneous sensors (or sensor modules) 217a, 217b, . . . , 217n. End-users may access platform 200 via one or more end-user devices 219a, 219b, . . . , 219n. While specific reference will be made to this particular implementation, it is contemplated that platform 200 may embody many forms and include multiple and/or alternative components. For example, it is contemplated that the components of platform 200 may be combined, located in separate structures, or separate locations. In other instances, certain features or functions provided by platform 200 may be implemented by (or in conjunction with) one or more sensor 217a-217n and/or one or more end-user devices 219a-219n.

According to exemplary embodiments, platform 200 may embody one or more applications and/or application servers accessible to end-user devices 219a-219n over one or more of networks 109-115. Users (or subscribers) can access platform 200 to create, customize, and manage sensor content, as well as generate and modify one or more user profiles that, in exemplary embodiments, include an array of user profile information for initiating or performing one or more of the processes described herein. It is contemplated that various ones of these processes may be dynamically initiated (or performed) based on real-time or historically sensed information corresponding to one or more end-user environments and, in certain instances, further based on correlation with user profile information. As such, platform 200 provides a user interface, e.g., a web portal or otherwise networked application, to permit end-user access to the features and functionalities of platform 200 via end-user devices 219a-219n. According to certain embodiments, user interface module 215 may be configured for exchanging information between end-devices 219a-219n and a web browser or other network-based application or system, such as a voice browser or voice recognition system. According to other embodiments, user interface module 215 may provide a virtual interface to sensors 217a-217n to enable end-users to interact (or otherwise control) sensors 217a-217n.

In exemplary embodiments, user interface module 215 executes a graphical user interface (GUI) configured to provide users with one or more menus of options for creating, customizing, and managing user profiles, as well as engaging with the various other features of the managed remote monitoring services (or functionalities) of system 100, such as obtaining customizable presentations or reports of sensor information and alert notifications associated with one or more sensed conditions associated with one or more end-user environments. The GUI may also be utilized, in conjunction with sensor interface module 213, for interacting with or otherwise controlling sensors 217a-217n. Accordingly, the GUI may be utilized to create criteria for generating and receiving customizable alert notification 123 and reports 125.

According to various embodiments, sensor interface module 213 is configured to receive signals from heterogeneous sensors 217a-217n via, for example, one or more of communication networks 109-115. Additionally (or alternatively), sensor interface module 213 may monitor "currently" sensed conditions (or states) of heterogeneous sensors 217a-217n associated with one or more end-user environments for particular sensed conditions, states, or parameters. In this manner, sensor interface module 213 may receive signals and/or monitor sensed conditions of heterogeneous sensors 217a-217n over any suitable time interval, which may be predefined and/or configured by, for instance, end-users, network administrators, etc. For example, a configurable time interval may be established for monitoring end-user environments continuously or over several seconds, minutes, hours, days, etc. Further, the configurable time intervals may be subdivided into a plurality of configurable subintervals. Namely, a time granularity for the configurable time interval can be assigned, which enables sensed conditions to be analyzed at various temporal "grains" of the configurable time interval. It is noted that sensor interface module 213 may also be configured to generate (or otherwise reduce) the received signals or monitored conditions to corresponding sensor information (or data). Alternatively (or additionally), sensor interface module 213 may directly receive sensor information from heterogeneous sensors 217a-217n.

In exemplary embodiments, sensor information may corresponding to real-time conditions or historical conditions relating to one or more of the various aforementioned sensory parameters, such as thermal parameters, biological parameters, electromagnetic parameters, mechanical parameters, chemical parameters, optical radiation parameters, ionizing radiation parameters, networking parameters, and the like. As such, received signals and/or generated (or received) sensor information may be stored to one or more suitable storage locations of system 100, such as sensor content repository 117, a memory (not shown) of platform 200, etc.

According to one embodiment, sensor interface module 213 conveys (e.g., ports, transmits, etc.) sensor information to notification module 205 and/or presence service module 207, which provide functions of a traditional presence server. This sensing process may be performed in real-time (i.e., as the information is generated or collected), on a periodic basis (e.g., after a predetermined time period, such as at the conclusion of one or more subintervals, or the conclusion of the configurable time interval), or in an "on-demand" fashion (i.e., when requested by, for example, an end-user). Additionally (or alternatively), sensor information is provided to notification module 205 and/or presence service module 207 to be subsequently analyzed upon detection of one or more sensory events, such as the initialization of a particular heterogeneous sensor (e.g., heterogeneous sensor 217a), e.g., a video recording heterogeneous sensor configured to begin recording video upon detection of motion via, for example, a heterogeneous motion sensor.

Notification module 205 may be configured to dynamically correlate the sensor information with one or more end-user specified criteria (or threshold sensed conditions) stored to, for example, user profiles repository 119 or any other suitable storage location of system 100, such as a memory of platform 200, end-user devices 219a-219n, heterogeneous sensors 217a-217n, sensor content repository 117, etc. It is noted that the criteria may be associated with select end-users and/or select heterogeneous sensors. Further, it is noted that these storage locations may be synchronized. As such, notification module 205 may receive (or retrieve) sensor information and/or end-user specified criteria from one or more of the aforementioned storage locations, or may query sensor interface module 213 and/or a communication interface (not shown) of platform 200 to acquire this information (or content). In this manner, notification module 205 may compare the sensor information with the criteria (e.g., thresholds) to determine whether an alert notification is to be provided to select end-users at one or more of end-user devices 219a-219n. For example, an alert notification 123 may be issued when a specified audio condition (e.g., threshold decibel level) is detected by a corresponding acoustic heterogeneous sensor. As such, alert notification 123 may be issued to select end-users at one or more of end-user devices 219a-219n based on user profile information (e.g., alert notification criteria) stored to, for example, user profiles repository 119. For example, when the specified audio condition is detected, alert notification 123 may be issued to a first end-user at a first end-user device (e.g., end-user device 219a) and another end-user at another end-user device (e.g., end-user device 219b). In exemplary embodiments, alert notifications 123 may be distributed by notification module 205 via instant message communications, which may be formulated according to specified communication protocols. For example, notification module 205 may formulate the following XMPP message stanza for conveying a "low" viscosity measurement associated with a viscosity-level heterogeneous sensor:

```
<message
    to=John_Doe@example.com'
    from='Viscosity_Level@example.com/sensor'
    type='headline'
    xml:lang='en'>
    <body>Low Viscosity! Viscosity Level 3%</body>
</message>
```

In this example, end-user "John_Doe@example.com" will receive a "Low Viscosity! Viscosity Level 3%" message from the "Viscosity_Level@example.com/sensor" viscosity-level heterogeneous sensor. It is also noted that the presentation of alert notifications 123 issued to end-users may be also be generated and distributed based on user profile information. For instance, a first end-user may receive a textual alert notification 123 via a short message, while another end-user may receive an audible alert notification 123 via a voice call, while still further end-users may be receive multimedia alter notifications 123 via electronic mail. As such, it is contemplated that any number or forms of alert notifications 123 may be issued and, thereby, customized for any number of select end-users at one or more end-user devices 219a-219n.

According to exemplary embodiments, sensor monitoring platform 200 may also be configured to determine and exchange presence information, such as rich presence information, associated with, for example, sensors 217a-217n and/or end-user devices 219a-219n. With respect to sensors 217a-217n this presence information may relate to the ability of sensors 217a-217n to convey sensor information to platform 200, end-user devices 219a-219n, and/or instant communication services 121, as well as "currently" sensed conditions, such as one or more of the aforementioned sensed parameters. In this manner, presence service module 207, as a presence server, may act as a "broker" of presence information, i.e., the handler of consumers of presence (e.g., end-users at end-user devices 219a-219n) and producers of presence (e.g., heterogeneous sensors 217a-217n). As previously noted, one or more consumers of presence may subscribe to the publication of presence (e.g., rich presence information) of one or more producers of presence (presentities). As such, presence service module 207 may, such as in conjunction with authentication module 201 and/or user profiles repository 119, be configured to authorize watchers to receive (or otherwise access) the presence publications of one or more presentities, such as sensors 217a-217n. An exemplary model for presence and presence determination are respectively detailed in Internet Engineering Task Force (IETF) Request for Comments (RFC) 2778 and 2779, which are incorporated herein, by reference, in their entireties. An exemplary data format for conveying presence information, as well as extensions to that format for conveying rich presence information, are respectively detailed in IETF RFCs 3863 and 4480, which are incorporated herein, by reference, in their entireties. According to particular embodiments, presence service module 207 may be configured to receive sensor information and/or signals corresponding to respective heterogeneous sensors 217a-217n to determine and distribute rich presence information to select end-users at select end-user devices 219a-219n via one or more instant communication sessions. As such, heterogeneous sensors 217a-217n need not, but may, be configured for autonomously providing rich presence information to platform 200 for distribution to one or more end-users at one or more end-user devices 219a-219n. It is also noted that the instant communication sessions may be persisted (or otherwise supported by) platform 200 and/or any other suitable third-party instant communication service provider. Accordingly, instant communication services 121 may provide for one or more of the functions of presence service module 207, which handles presence information. In other instances, instant communication services 121 may operate in tandem with presence service module 207.

In exemplary embodiments, the presence or rich presence of heterogeneous sensors 217a-217n may be indicated to end-users via, for example, one or more instant messaging sessions corresponding to respective heterogeneous sensors. Namely, those end-users who are authorized to and, subsequently, have established heterogeneous sensors 217a-217n as "contacts" or "buddies" within their instant communication "contact" or "buddy lists" may receive the presence or rich presence of heterogeneous sensors 217a-217n. Thus, whereas the presence of an end-user may have information on the availability of the end-user to receive instant communications, the rich presence of a heterogeneous sensor may relate to the "currently" sensed conditions detected by one or more heterogeneous sensors 217a-217n. For example, a "currently" sensed condition of a temperature and humidity heterogeneous sensor may be distributed by presence service module 207 via one or more presence stanzas conforming to particular communication protocols, such as the following XMPP presence stanza:

```
<presence xml:lang='en'>
    <status>Temperature 64F, Humidity 23%</status>
</presence>
```

Accordingly, those end-users at end-devices 219a-219n subscribing to the sensor information of the temperature and humidity sensor may be presented with the rich presence of the temperature and humidity sensor, i.e., Temperature 64 F, Humidity 23%. To this effect, MPOP for a multiple heterogeneous sensors 217a-217n may be combined by presence service module 207 to distribute an aggregated rich presence of heterogeneous sensors 217a-217n. This may be useful for end-users subscribing to numerous forms of sensor information associated with one or more end-user environments. Namely, an aggregated rich presence may be conveyed to end-users to convey that each of heterogeneous sensors 217a-217n and/or each of the associated end-user environments exhibit acceptable conditions, i.e., no alert notification 123 is necessary. In this manner, only those heterogeneous sensors 217a-217n sensing, or those end-user environments exhibiting, "unacceptable" conditions may be otherwise conveyed. Further, MPOP for the select end-users may be utilized by presence service module 207 to determine end-user devices 219a-219n available to receive the presence or rich presence of heterogeneous sensors 217a-217n. Again, presence service module 207 may operate in tandem with instant communication services 121 to perform one or more of the aforementioned functions.

In the event that a sensed condition becomes "unacceptable," e.g., is above, below, or at a threshold parameter or above, below, or within a range of threshold parameters, presence service module 207 may distribute an alert notification 123 via select instant communication sessions to update the presence or rich presence of particular heterogeneous sensors 217a-217n. In this manner, alert notifications 123 may be issued via, for example, instant communications. For example, alert notifications 123 provided via instant message communications may be conveyed as alert notification presence icons and/or sensor information that is configured to audibly and/or visually convey alert conditions to select end-users. For example, a "low" measurement detected by a fluid level sensor may be distributed to select end-users via, for instance, the following XMPP presence stanza:

```
<presence xml:lang='en'>
    <show>Low Fluid</show>
    <status>Fluid Level 30%</status>
</presence>
```

Consequently, those end-users subscribing to the presence and alert notifications 123 of the fluid sensor may be presented with a "normal" status indicative of a sensed fluid level within "acceptable" boundaries, i.e., within an end-user specified threshold range. End-users may be presented with a "low fluid" or "high fluid" status indicative of a sensed fluid level not within "acceptable" boundaries and, thereby, associated with one or more problematic conditions. As such, relevant sensor information may be conveyed in alert notification 123 to permit select end-users to realize the gravity of the problematic condition(s). In the above example, end users receiving the "Low Fluid" alert notification 123 will also be presented with a relative fluid level measurement, i.e., "Fluid Level 30%." An exemplary display of rich presence information is described in more detail in accordance with FIG. 8, while exemplary alert notification presence icons are more fully explained in conjunction with FIGS. 9A-9C.

Sensor information generated by sensor interface 213 and/or stored to a suitable storage location of system 100 (e.g., sensor content repository 117) may be provided to reporting module 209 for generating one or more reports of sensor information. According to certain embodiments, the reports are made available to selective end-users upon request and/or based on user profile information stored to a suitable storage location of system 100 (e.g., user profiles repository 119). For instance, the user profile information may include one or more schedules for conveying reports to select authorized end-users at select end-user devices 219a-219n at predetermined times. Accordingly, scheduling tables may be generated by end-users for scheduling the generation and reception of reports. In this manner, scheduling module 211 may be utilized to resolve the "who," "what," "when," "where," and "how" aspects for transmitting the reports to authorized end-users.

In exemplary embodiments, reports may be generated by reporting module 209 and provisioned to end-users in the form of an electronic mailing, facsimile transmission, instant communication, multimedia message, postal mailing, short message, voice call, or any other suitable mode of communication, as well as combinations thereof. In other embodiments, a report may be accessible to end-users at end-user devices 219a-219n via a networked application (e.g., website). For instance, a report may be "viewed" or "downloaded" by an end-user via an online graphical user interface (GUI) hosted by, for example, platform 200. That is, user interface module 215 of platform 200 may be configured to provide network access to generated reports and/or configurable variables of reporting module 209. As such, platform 200 can provide end-users with a common set of networked applications for monitoring, analyzing, and reporting on the "currently" sensed conditions (or states) of one or more end-user environments, as well as providing access to generated reports of historical sensor information.

Besides resolving "who," "what," "when," "where," and "how" aspects of generating and transmitting alert notifications 123, presence information (e.g., rich presence information), and/or reports 125, scheduling module 211 may also be configured to receive sensor information, alert notifications 123, and/or user profile information. Accordingly, scheduling module 211 may determine whether certain maintenance services are required, whether preventative or rehabilitative, based on the sensor information, alert notifications 123, and/or user profile information. Further, based on a schedule (or calendar) of a particular end-user (stored to, for example, user profiles repository 119), scheduling module 211 may convey "suggested" time slots to the end-user for scheduling certain maintenance services with particular maintenance service providers. It is noted that maintenance service provider schedules may be acquired (or otherwise provided to) scheduling module 211 over, for example, one or more of communication networks 109-115. In certain exemplary embodiments, scheduling module 211 may be further configured to communicate with various maintenance service providers for automatically scheduling end-users for service procedures, such as based on the respective schedules of the end-users and maintenance service providers. It is noted that scheduling module 211 may utilize one or more forms of communication for suggesting time slots to end-users or scheduling maintenance service procedures with select maintenance service providers. For example, scheduling module 211 may utilize electronic mail messages, facsimile transmissions, instant communications, multimedia messages, postal mailings, short messages, voice calls, etc., or combinations thereof, to suggest time slots and/or automatically scheduling maintenance service procedures. It is contemplated that end-users at end-user devices 219a-219n may, via user interface module 215, specify criteria for suggesting time slots and/or selecting between particular maintenance service providers for scheduling maintenance service procedures. The criteria may be stored to any suitable storage location of system 100, such as user profiles repository 119.

To provide selective access to the features and functions of system 100, platform 200 may also include an authentication module 201 for authenticating (or authorizing) sensors and/or users to the managed monitoring services. It is contemplated that authentication module 201 may operate in concert with sensor interface module 213 and/or user interface module 215. That is, authentication module 201 may verify sensor or user provided credential information acquired via sensor interface module 213 or user interface module 215 against corresponding credential information stored within a user profile of, for example, user profiles repository 119. By way of example, the credential information may include "log on" information corresponding to a user name, password, coded key, or other unique identification parameter, such a personal identification number (PIN), etc. In other embodiments, the credential information may include any one, or combination of, a birth date, an account number (e.g., bank, credit card, billing code, etc.), a social security number (SSN), an address (e.g., work, home, internet protocol (IP), media access control (MAC), etc.), or telephone listing (e.g., work, home, cellular, etc.), as well as any other form of uniquely identifiable datum, e.g., biometric code, key code, voice print, etc. Sensors 217a-217n or users, via end-devices 219a-219n, may provide this information in any suitable manner, such as by spoken utterances, dual-tone multi-frequency signals (DTMF), packetized transmission, etc. Unobtrusive security may be provided by positively identifying and screening sensors 217a-217n or users based on one or more of the aforementioned credentials that may be seamlessly provided to authentication module 201 when sensors 217a-217n or end-devices 219a-219n communicate with platform 200, such as a unique IP or MAC address. Other unobtrusive measures can be made available via user specific voice prints, etc.

Additionally, platform 200 may also include one or more processors (or controllers) 203 for effectuating the processes described herein, as well as one or more memories (not shown) for permanent or temporary storage of one or more of the aforementioned commands, notifications, parameters, reports, variables, etc. It is also noted that various features and/or functions of platform 200 may be assumed, in part or in whole, by heterogeneous sensors 217a-217n. As previously mentioned, an exemplary heterogeneous sensor is described in more detail in accordance with FIG. 11.

Figure 3:
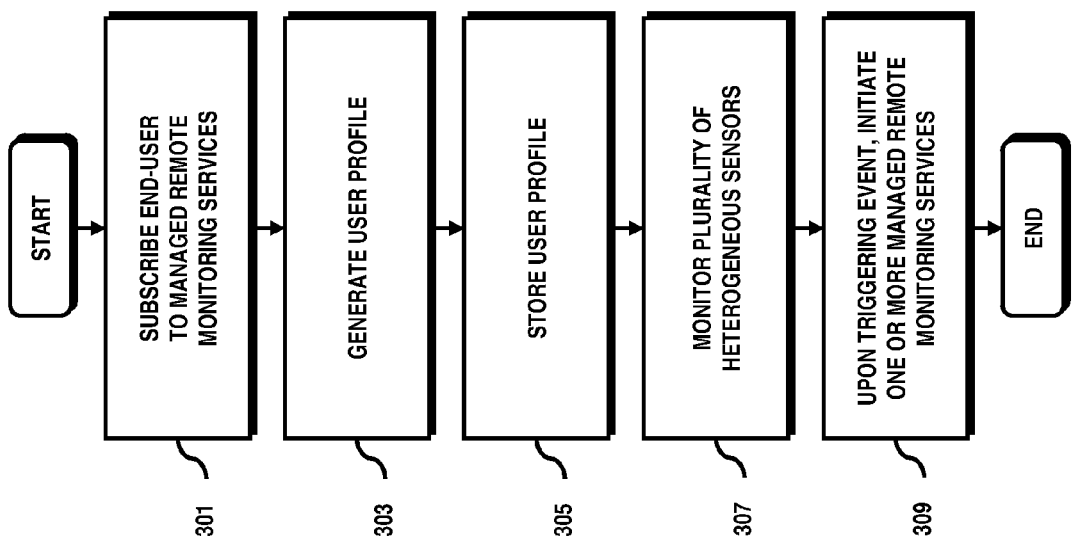
FIG. 3 is a flowchart of a process for providing managed remote monitoring services, according to an exemplary embodiment.

FIG. 3 is a flowchart of a process for providing managed remote monitoring services, according to an exemplary embodiment. For illustrative purposes, the process is described with respect to FIGS. 1 and 2. It is noted that the steps of the process may be performed in any suitable order, as well as combined or separated in any suitable manner. At step 301, sensor monitoring platform 101 subscribes an end-user to the managed remote monitoring services of system 100. According to one embodiment, the end-user may subscribe utilizing an end-user device capable of processing and transmitting information over one or more of communication networks 109-115, such as computing device 103, mobile device 105, or voice station 107. Namely, the end-user may interact with an input interface of, for example, mobile device 105 to activate software resident on the device, such as a GUI or other networked application that interfaces with (or is implemented by) platform 101. As such, the end-user can register as a new subscriber of the managed remote monitoring services, as well as obtain sufficient authentication information for establishing future sessions with platform 101. In certain embodiments, registration procedures may prompt the end-user to identify those end-user devices 103-107 and/or heterogeneous sensors 217a-217n that the end-user may employ to interact with the managed remote monitoring services of system 100. It is noted that users may be provided later access to the GUI for adding or subtracting end-user devices 103-107 and/or heterogeneous sensors 217a-217n. In this manner, registered devices may be logically associated with the end-user.

Once registered, platform 101 enables the end-user, per step 303, to generate a user profile including various criteria for customizing, generating, modifying, requesting, scheduling, transmitting, etc., alert notifications 123, presence information, rich presence information, reports 125, and maintenance procedures to select end-users at one or more of select end-user devices 103-107. The user profile may also include the earlier described user profile information, e.g., username, password, account information, billing information, configuration information, and the like, as well as include the aforementioned criteria. Thus, user profile information may be utilized by sensor monitoring platform 101 and/or heterogeneous sensors 217a-217n for selectively initiating one or more of the features or functions described herein.

Sensor monitoring platform 101 stores user profiles to a list of subscribers to the managed remote monitoring services of system 100, as well as a list of subscriber device identifiers, authentication information, and user-defined criteria to, for example, user profiles repository 119, per step 305. It is contemplated that sensor monitoring platform 101 may additionally (or alternatively) store or synchronize this information to a memory of, for instance, sensor monitoring platform 101, one or more memories of end-user devices 103-107, or any other suitable storage location of system 100, such as sensor content repository 117, etc. It is contemplated that users may directly interact with one or more of these storage locations or facilities, such as user profiles repository 119.

At step 307, sensor monitoring platform 101 monitors a plurality of heterogeneous sensors 217a-217n associated with the end-user (and, thereby, an end-user environment) based on, for example, one or more sensed conditions of heterogeneous sensors 217a-217n in comparison to various end-user specified criteria. The end-user specified criteria may be stored to, for example, user profiles repository 119. Accordingly, per step 309, one or more managed remote monitoring services (e.g., generation and transmission of alert notifications 123, presence information, rich presence information, and/or reports 125, or initiating maintenance service scheduling) may be initiated based upon a triggering event, such as achieving a particular sensed condition in relation to a specified threshold condition (or parameter). It is also contemplated that sensor monitoring platform 101 can signal respective heterogeneous sensors 217a-217n to perform certain tasks. Further, it is also contemplated that the aforementioned process may be wholly or partly performed by heterogeneous sensors 217a-217n and/or by end-user devices 219a-219n, as opposed to sensor monitoring platform 101.

Figure 4:
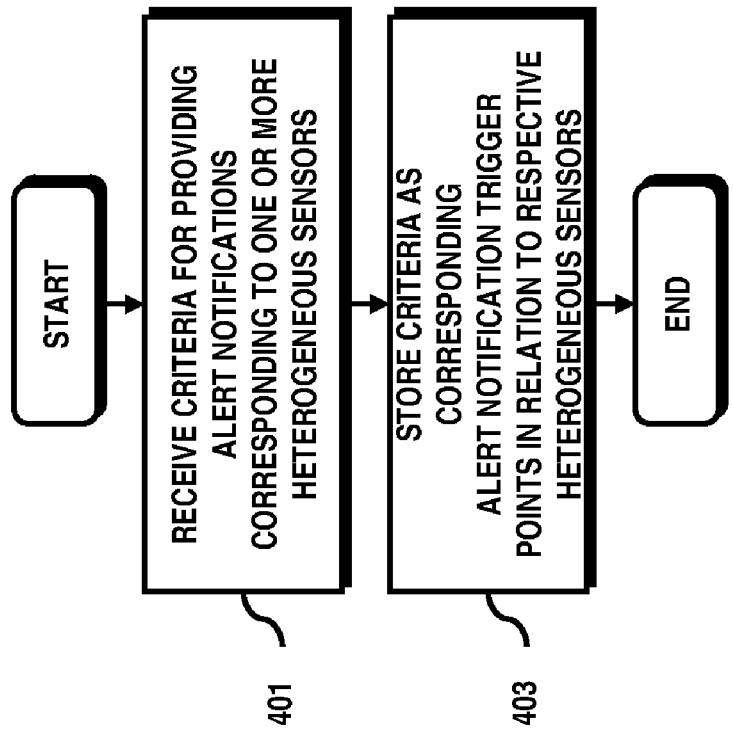
FIG. 4 is a flowchart of a process for establishing one or more alert notification trigger points, according to an exemplary embodiment.

FIG. 4 is a flowchart of a process for establishing one or more alert notification trigger points, according to an exemplary embodiment. For illustrative purposes, the process is described with respect to sensor monitoring platform 200; however, it is contemplated that the process may be performed by heterogeneous sensors 217a-217n. At step 401, platform 200 receives various criteria for providing one or more alert notifications corresponding to one or more heterogeneous sensors 217a-217n from, for example, an authenticated end-user at an end-user device (e.g., end-user device 219a) via, for instance, a GUI of user interface module 215. It is noted that heterogeneous sensors 217a-217n may be deployed in (or to) one or more end-user environments and may, thereby, be configured to sense one or more conditions of the one or more end-user environments. As such, the criteria may relate to one or more threshold parameters, correspondences between threshold parameters, associations between "currently" sensed conditions and threshold parameters, relationships between threshold parameters and correspondences and one or more heterogeneous sensors, end-users authorized to receive generated alert notifications, end-user devices authorized to receive generated alert notifications, scheduling parameters, customization options for personalizing alert notification presentations, and/or any other suitable parameter for generating and transmitting alert notifications 123 to one or more select end-users at one or more select end-devices 103-107 via one or more modes of communication. Accordingly, platform 200 may store the received criteria as corresponding alert notification trigger points in relation to respective heterogeneous sensors 217a-217n to any suitable storage location of system 100, such as sensor content repository 117, user profiles repository 119, or a memory of platform 200, heterogeneous sensors 217a-217n, or end-user devices 219a-219n, as well as any combination thereof. It is noted that, in those instances when relevant criteria is stored (or at least accessible) to respective heterogeneous sensors 217a-217n, heterogeneous sensors 217a-217n may, according to certain exemplary embodiments, perform one or more of the features or functions of platform 200.

Figure 5:
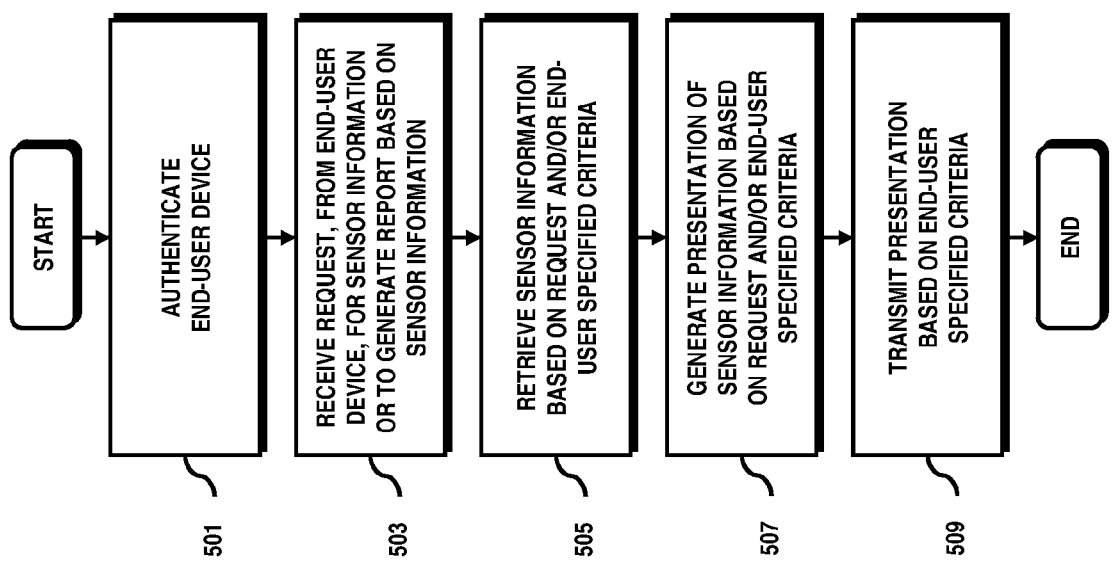
FIG. 5 is a flowchart of a process for transmitting sensor information to end-users, according to an exemplary embodiment.

FIG. 5 is a flowchart of a process for transmitting sensor information to end-users, according to an exemplary embodiment. For illustrative purposes, the process is described with respect to platform 200 of FIG. 2; however, the process may be implemented via (or in conjunction with) heterogeneous sensor 1100 of FIG. 11. It is also noted that the steps of the process may be performed in any suitable order, as well as combined or separated in any suitable manner. At step 501, authentication module 201 authenticates (or authorizes) an end-user device (e.g., end-user device 219a) to one or more of the managed remote monitoring services of system 100. According to particular embodiments, end-user devices 219a-219n may be automatically authenticated to all (or various ones of) the remote monitoring services of system 100 upon successful authentication to particular managed remote monitoring services, such as successful authentication to one or more suitable instant communication sessions. In step 503, platform 200 receives a request, from end-user device 219a, for sensor information and/or to generate a report based on sensor information. In certain implementations, the received request may include one or more criteria for generating one or more reports and/or presentations of the sensor information. Additionally, received requests may include criteria for transmitting reports and/or presentations of sensor information to one or more select end-users at one or more select end-user devices 219a-219n via select modes of communication. Alternatively (or additionally), these forms of criteria may be retrieved from, for example, user profiles repository 119 or any other suitable storage location of system 100. At any rate, platform 200 may retrieve, per step 505, sensor information based on the request and/or one or end-user specified criteria. It is noted that the sensor information may be retrieved from sensor interface module 213, notification module 205, sensor content repository 117, and/or any other suitable storage location of system 100. At step 507, one or more of presence service module 207, reporting module 209, notification module 205, and/or user interface module 215 generates a corresponding presentation (e.g., report, instant message, etc.) of the retrieved sensor information based on the request and/or end-user specified criteria. Accordingly, in step 509, the presentation is transmitted to authorized end-user devices 219a-219n based on the request and/or end-user criteria. As previously mentioned, the transmission of the sensor information may be in the form of an electronic mailing, facsimile transmission, GUI display, instant communication, multimedia message, postal mailing, short message, voice call, or any other suitable mode of communication, as well as combinations thereof.

Figure 6:
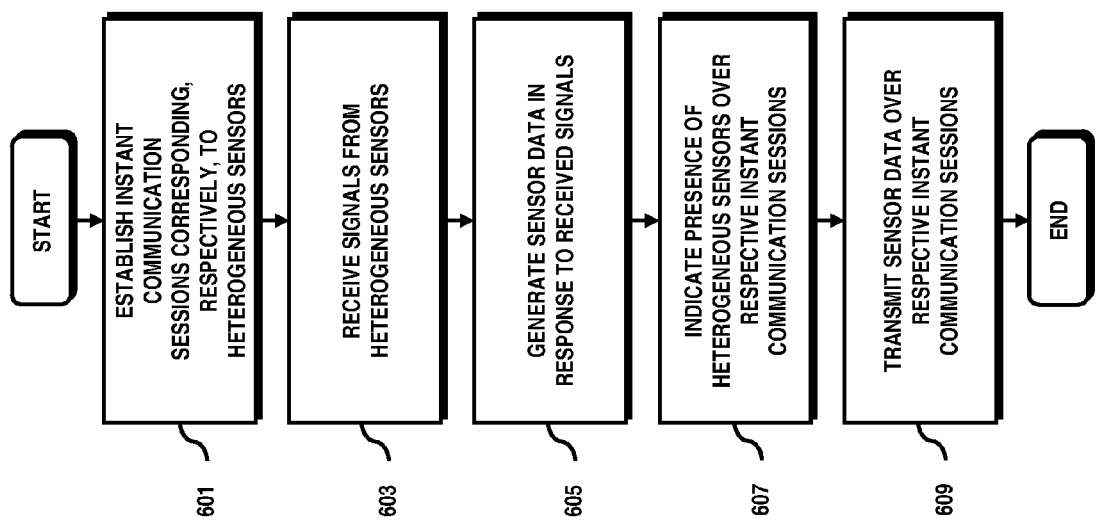
FIG. 6 is a flowchart of a process for transmitting heterogeneous sensor presence to end-users, according to an exemplary embodiment.

FIG. 6 is a flowchart of a process for transmitting heterogeneous sensor presence to end-users, according to an exemplary embodiment. For illustrative purposes, the process is described with respect to platform 200 of FIG. 2; however, the process may be implemented via (or in conjunction with) heterogeneous sensor 1100 of FIG. 11 and/or instant communication services 121 of FIG. 1. It is also noted that the steps of the process may be performed in any suitable order, as well as combined or separated in any suitable manner. At step 601, presence service module 207 establishes a plurality of instant communication sessions corresponding, respectively, to a plurality of heterogeneous sensors 217a-217n. The instant communication sessions may be hosted by presence service module 207 and/or any suitable third party instant communication service 121. In this manner, instant communication sessions (e.g., instant messaging sessions) may be established between one or more end-user devices 219a-219n and heterogeneous sensors 217a-217b. Accordingly, it is contemplated that end-users at end-devices 219a-219n may create "contact (or buddy) lists," wherein various ones of the contacts relate to one or more of heterogeneous sensors 217a-217n. In a similar fashion, heterogeneous sensors 217a-217n may be configured with one or more "contact lists" within a memory (not shown) of heterogeneous sensors 217a-217n. As such, heterogeneous sensors 217a-217n may directly established instant communication sessions with authorized end-user devices 219a-219 or may indirectly establish the instant communication sessions with authorized end-user devices 219a-219n via platform 200 and/or one or more suitable third party instant messaging services 121.

In step 603, sensor interface module 213 receives a plurality of signals from the heterogeneous sensors, such as over one or more of networks 109-115 and/or via one or more of the established instant communication sessions. Accordingly, sensor interface module 213 may be configured to generate (when necessary) sensor data in response to the received signals, per step 605. The sensor data may be ported to presence service module 207 to determine and, thereby, indicate (e.g., transmit) the rich presence of heterogeneous sensors 217a-217n (over respective ones of the instant communication sessions) to authorized end-user devices 219a-219n "subscribing to" the presence (e.g., rich presence) of respective heterogeneous sensors 217a-217n, at step 607. Depending on various end-user specified criteria stored to, for example, user profiles repository 119, presence service module 207 may customize the presentation of the presence of heterogeneous sensors 217a-217n to end-users, end-user devices 219a-219n, etc. Further, while the process of FIG. 6 has been discussed in the hitherto manner, it is also contemplated that heterogeneous sensors 217a-217a may directly transmit the sensor data and/or presence information (which may include rich presence information) to sensor interface module 213 and/or presence service module 207 via the signals. In other instances, heterogeneous sensors 217a-217n may be further configured to host instant communication sessions, as well as configured to act as "brokers" of presence information, such as rich presence information. As such, heterogeneous sensors 217a-217n may be configured to execute one or more of the aforementioned features provided by platform 200 and/or instant communication services 121. At any rate, and as previously noted, the rich presence of heterogeneous sensors 217a-217n may relate to general sensory observations (e.g., low fluid levels, high temperatures, decibel levels within a certain range, etc.), as well as may include particular parameters relating to "currently" sensed conditions (e.g., temperature 45 F, decibel level 3 dB, weight 5 lbs, etc.) associated with one or more end-user environments. As such, platform 200 via, for example, presence service module 207 may also transmit sensor data over the respective communication sessions, in step 609. It is particularly noted that steps 607 and 609 may be combined to reduce the amount of transmissions to end-user devices 219a-219n, such as for delivering rich presence information.

Figure 7:
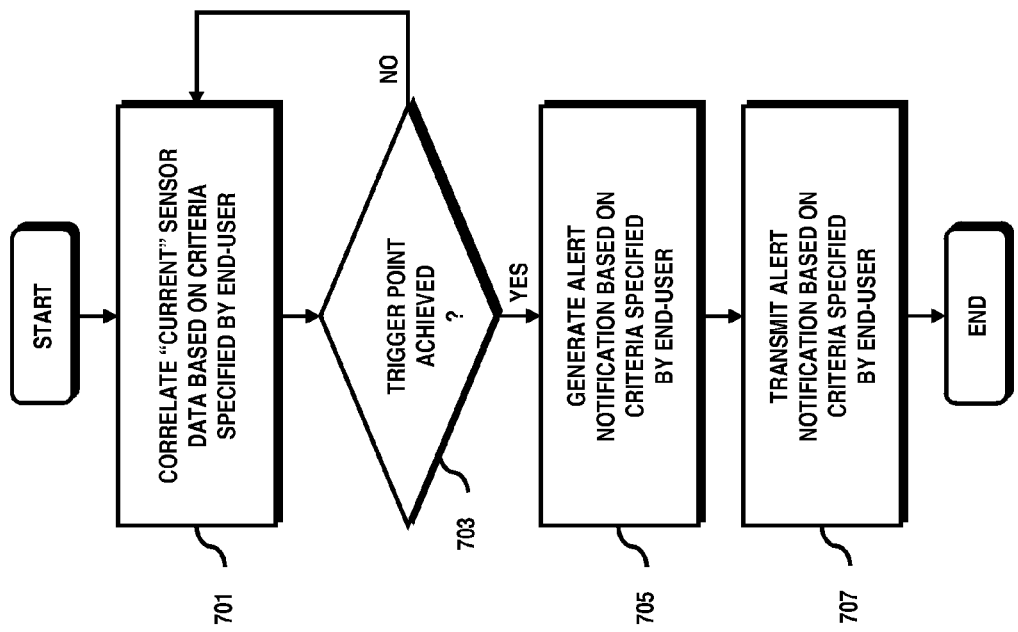
FIG. 7 is a flowchart of a process for transmitting alert notifications to end-users, according to an exemplary embodiment.

FIG. 7 is a flowchart of a process for transmitting alert notifications to end-users, according to an exemplary embodiment. For illustrative purposes, the process is described with respect to platform 200 of FIG. 2; however, the process may be implemented via (or in conjunction with) heterogeneous sensor 1100 of FIG. 11. It is also noted that the steps of the process may be performed in any suitable order, as well as combined or separated in any suitable manner. Furthermore, the process of FIG. 7 assumes the existence of sensor information and end-user specified criteria for triggering alert notifications 123, which may have been received from sensor interface module 213, user interface module 215, sensor content repository 117, user profiles repository 119, a memory of platform 200, heterogeneous sensors 217a-217n, end-user devices 219-219n, and/or any other suitable storage location of system 100. Accordingly, at step 701, notification module 205 correlates "current" sensor information (or data) based on criteria specified by one or more end-users. In step 703, notification module 205 determines if one or more alert notification trigger points have been achieved based on the correlations. For example, notification module 205 may determine whether a particular "currently" sensed condition is above, below, at, or within a particular threshold or range of thresholds. The particular relationship between the "currently" sensed condition(s) and the threshold(s) may be resolved by notification module 205 via the end-user specified criteria. If no alert notification trigger point has been achieved, the process reverts to step 701 so that notification module 205 may continue to correlate the most "currently" sensed conditions with the alert generation trigger points. If, however, an alert notification trigger point has been achieved, notification module 205 generates, per step 705, one or more alert notifications 123 based on criteria specified by the end-user. In exemplary embodiments, alert notifications are transmitted, in step 707, to end-user devices 219a-219n via an instant communication message, which may be a media or multimedia presentation and may include one or more alert notification presence icons, such as the alert notification presence icons of FIGS. 9A-9C. It is contemplated, however, that alert notifications 123 may be transmitted to users in alternative (or additional) modes, such as electronic mailing, facsimile transmission, multimedia message, postal mailing, short message, voice call, etc. In any case, the transmission of alert notifications 123 may be based on user criteria for distributing alert notifications 123 to authorized end-users at select end-user devices 219a-219b.

Figure 8:
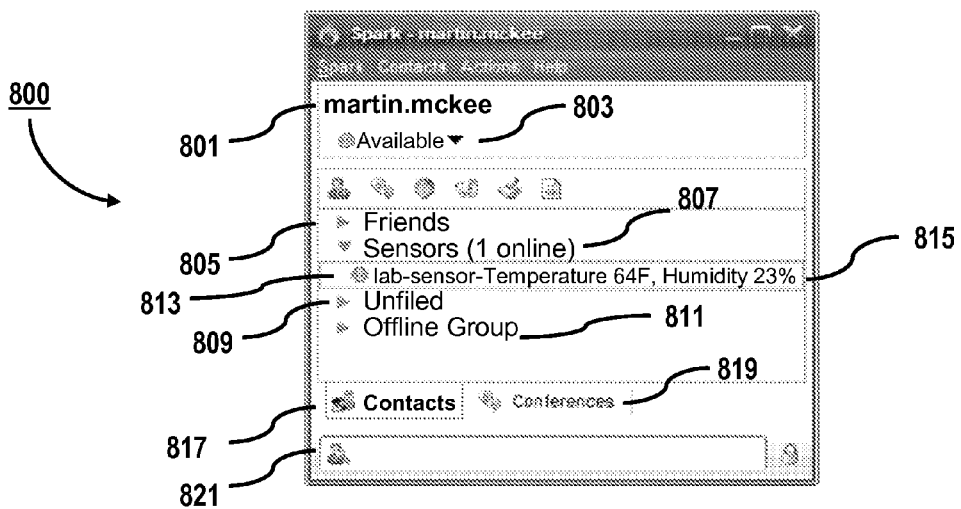
FIG. 8 is a diagram of an instant communication session interface displaying sensor information, according to an exemplary embodiment.

FIG. 8 is a diagram of an instant communication session interface displaying sensor information, according to an exemplary embodiment. The interface provides an instant communication session window 800 for a particular end-user, i.e., end-user "martin.mckee" subscribed to the remote monitoring services of system 100. As such, window 800 provides fields 801 and 803 for, respectively, presented the end-user logged into the instant message session and the presence of that end-user to receive instant communications (e.g., instant messages) via the instant communication interface. Window 800 also provides a region for presenting one or more "contact (or buddy) lists" of the end-user. For example, a "Friends" buddy list 805, a "Sensors" buddy list 807, and an "Unfiled" buddy list 809 are provided. Lists 805-809 may provide a unified listing of all the authorized contacts of the end-user that are "available," or "logged on" to an instant communication session, such that list 811 may be provided for those authorized contacts within one or more of the buddy lists of an end-user that are "unavailable" or otherwise not "logged on" to an instant communication session. Accordingly, lists 805-811 may include various contacts listed therein. For instance, "Sensors" buddy list 807 includes "lab-sensor" having presence information 813 (e.g., a color coded availability icon) and rich presence information 815 (e.g., "currently" sensed information) presented therewith. In this example, the "lab-sensor" is a temperature and humidity heterogeneous sensor with rich presence information 815 of "Temperature 64 F, Humidity 23%."

According to exemplary embodiments, window 800 may also include one or more tabs (e.g., tabs 817 and 819) for toggling between various features of window 800, such as toggling between contact lists and instant communication sessions (termed "Conferences" in this instance). An input field 821 may be provided to conveying messages via window 800 and, thereby, the instant communication service 121 hosting the various instant communication sessions of window 800.

Figure 9A:
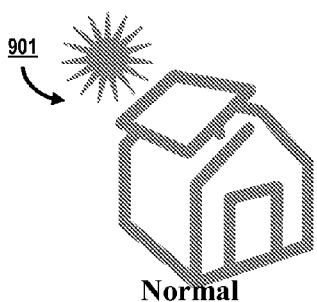
FIGS. 9A-9C are diagrams of illustrative alert notification presence icons, according to exemplary embodiments.
Figure 9B:
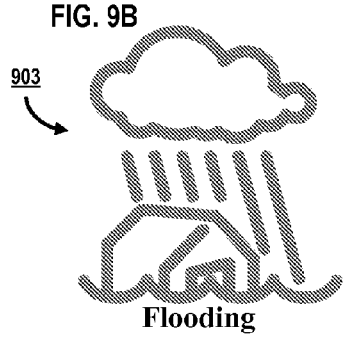
Figure 9C:
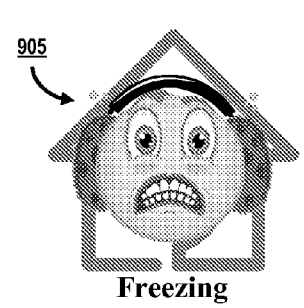

Besides presence and rich presence information in the form of actual sensor information, certain embodiments of system 100 enable alert notification presence icons to be presented to end-users, such as via one or more instant communication sessions FIGS. 9A-9C are diagrams of illustrative alert notification presence icons, according to exemplary embodiments. In this example, one or more heterogeneous sensors may have been deployed within a home of an end-user, such as one or more heterogeneous sensors for sensing temperature, moisture content, fluid levels, motion, and air quality. As such, the deployed heterogeneous sensors may be configured to notify the end-user and/or one or more other authorized end-users of sensory alert conditions within the home when the end-user is away. Accordingly, alert notification presence icon 901 may be conveyed to the end user to apprise the end-users of a "Normal" status, i.e., that aggregately, the "currently" sensed conditions associated with the home of the end-user exhibit acceptable values, i.e., that the temperature, moisture content, fluid levels, motion, and air quality of the home are acceptable to the end-user based on previously specified criteria. By contrast, icons 903 and 905 may be utilized to convey to the end-user that the home is exhibiting at least one "unacceptable" value. For instance, if the fluid level in the home rises, icon 903 may be utilized to convey "Flooding" conditions. If the temperature within the home falls below a certain specified temperature, icon 905 may be utilized to covey "Freezing" conditions within the home. As such, by simply glancing over the alert notification presence icons of those sensors within a buddy list of the end-user, that end-user may be able to ascertain, relatively quickly, what, if any, problematic conditions exist at their remotely located home. For instance, freezing conditions may be indicative of a furnace failure, an open window, etc. The flooding conditions may be indicative of broken water pipes, rising water tables, etc. In the instance of the air quality heterogeneous sensor, air quality relating to abnormal levels of carbon dioxide, natural gas, or other gaseous toxins may be made known to the end-user.

It is noted that the remote monitoring services are applicable across many different industries, such as the personal-user industry, business or commercial industry, industrial or manufacturing industry, and the like. For example, one or more heterogeneous sensors may be deployed within an office building of a business end-user to detect, for example, temperature, moisture content, motion, fire retardant system activation, light levels, etc. Accordingly, remote personnel can configured and monitor these sensor from, for example, a web browser interface extending over one or more of networks 109-115, such as over the Internet. The remote end-user can configured one or more criteria (e.g., thresholds, alert notification conditions, personal to contact in the event of alert notifications, etc.) so that if a particular sensors, in relation to particular ones of the criteria are established (e.g., deployment of a fire retardant), appropriate personnel can be notified and dispatched to the scene to remedy any problematic conditions.

In other settings, one or more heterogeneous sensors may be deployed for detecting whether maintenance is required on, for example, one or more vehicles, business equipment, personal yards, etc. Accordingly, various sensors may be deployed according to any vehicle maintenance items and an alert notification to schedule an appointment can be triggered when "currently" sensed conditions fall below adequate levels. As previously mentioned scheduling module 211 may be configured to suggest scheduling times or to automatically schedule required maintenance services. For example, the viscosity of the engine oil of a fleet of delivery trucks may be aggregated monitored, such that when the engine oil of the trucks starts to break down and become less viscous, the scheduling of oil changes may be automatically performed by scheduling module 211, such as scheduled to optimize the costs and locations of the various delivery trucks as they traverse their delivery routes. Thus, particular employees caring for the delivery trucks can be notified of the state of the engine oil and automatically notified as to a scheduled date for an oil change. In another example, a heterogeneous sensor may be deployed within the lawns of the customer of a landscaper. Accordingly, because growth occurs at different rates it is difficult for the landscaper to schedule when to cut one lawn versus another, which may result in particular lawns being excessive cut and other lawns not receiving enough attention. By contrast, alert notifications may be provided to the landscaper to apprise the landscaper of the various lengths of the lawns of the customers. Further, scheduling module 211 may be configured to optimize the maintenance of the lawns by the landscaper based on the real-time and historical growth of the lawns, as well as the schedules of the landscaper and homeowners.

Figure 10:
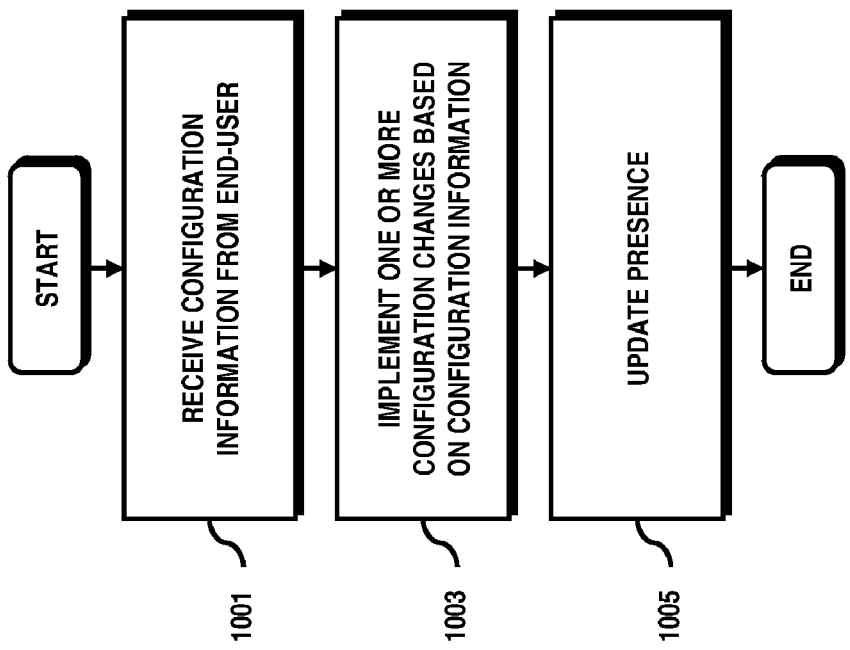
FIG. 10 is a flowchart of a process for remotely configuring a heterogeneous sensor, according to exemplary embodiments.

Given that most end-user environments undergo dynamic changes and experience many different potentially problematic conditions, exemplary embodiments of system 100 enable end-users at end-user devices 103-107 to remotely interact with (e.g., configure, manage, monitor, receive real-time feeds of sensed information, etc.) with deployed heterogeneous sensors. FIG. 10 is a flowchart of process for remotely configuring a heterogeneous sensor, according to exemplary embodiments. It is also noted that the steps of the process may be performed in any suitable order, as well as combined or separated in any suitable manner. It is also noted that the process of FIG. 10 assumes that an end-user at an end-user device (e.g., end-user device 219*a*) has been previously authorized to communicate with and, thereby, remotely configure a particular heterogeneous sensor, such as heterogeneous sensor 217*a*. At step 1001, heterogeneous sensor 217*a* receives configuration information for the end-user via one or more of networks 109-115.

According to particular embodiments, heterogeneous sensor 217*a* is configured to implement a user interface like that of user interface module 215 to permit authorized end-users to transmit configuration information to heterogeneous sensor 217*a*. In certain other embodiments, a virtual user interface to interact with heterogeneous sensor 217*a* may be provided by user interface module 215 for the end-user to provide configuration information to heterogeneous sensor 217*a*. According to still further embodiments, the end-user may be permitted to convey configuration information to heterogeneous sensor 217*a* via communicative transmission, such as one or more instant messages, short messages, text messages, voice calls, etc. As such, per step 1003, a controller (or processor) of heterogeneous sensor 217*a* may implement one or more configuration changes (e.g., adaptation to end-user specified threshold parameters, powering on/off heterogeneous sensor modules, etc.) to the "set-up" of heterogeneous sensor 217*a* based on the received configuration information. Accordingly, the controller may be further configured to parse the communications from the end-user for configuration information. Once heterogeneous sensor 217*a* implements the one or more configuration changes, heterogeneous sensor 217*a* may update its presence and/or rich presence via a remotely or locally accessible presence service module 207, such as according to the process of the FIG. 6.

Figure 11:
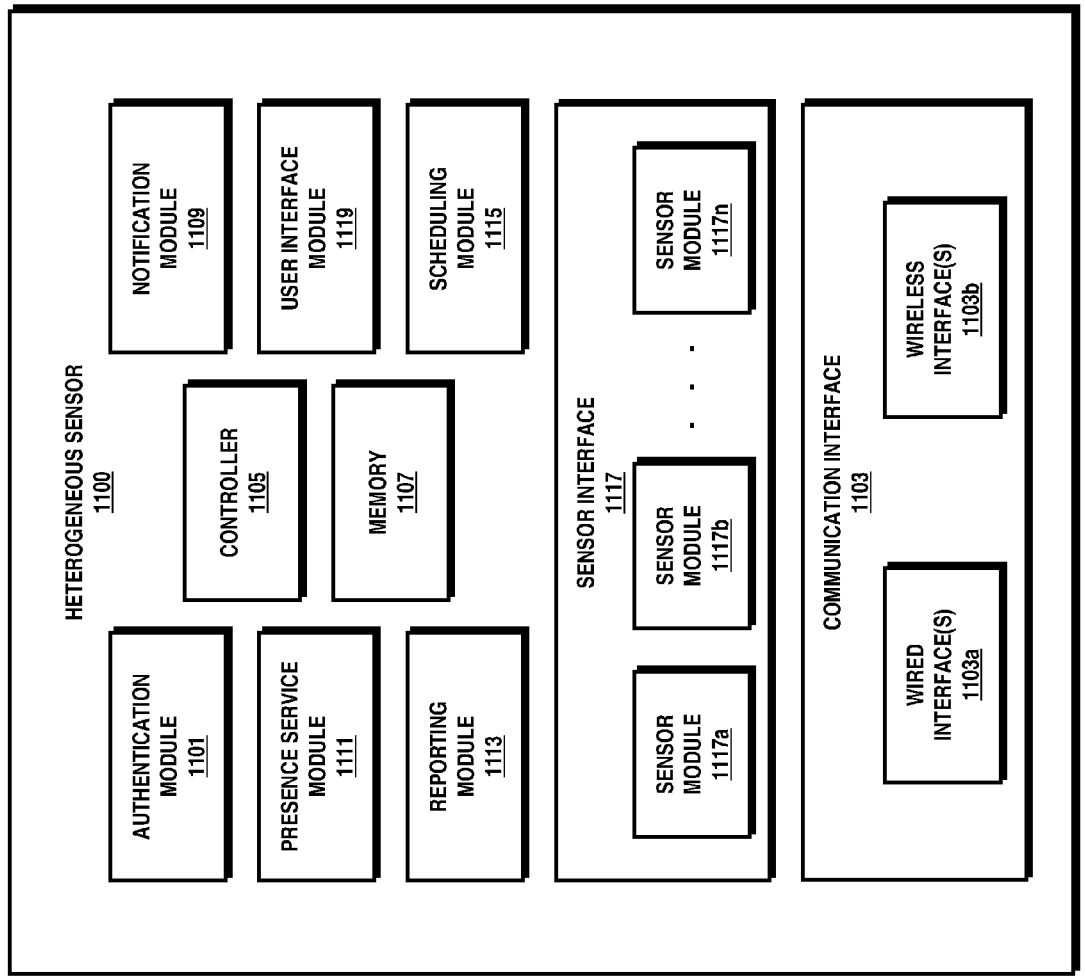
FIG. 11 is a diagram of a heterogeneous sensor, according to an exemplary embodiment.

FIG. 11 is a diagram of a heterogeneous sensor, according to an exemplary embodiment. Heterogeneous sensor 1100 may comprise computing hardware (such as described with respect to FIG. 12), as well as include one or more components configured to execute the processes described herein. In one implementation, sensor 1100 includes authentication module 1101, communication interface 1103, controller 1105, memory 1107, notification module 1109, presence service module 1111, reporting module 1113, scheduling module 1115, sensor interface 1117, and user interface module 1119. While specific reference will be made to this particular implementation, it is contemplated that sensor 1100 may embody other forms and include multiple and/or alternative components.

According to exemplary embodiments, the hardware and/or software of sensor 1100 is designed to support a wide range of data measurements and network access methods. In this manner, sensor 1100 may be divided into three divisional units, i.e., a communication interface 1103 section, a sensor interface 1117 section, and a processing section. Communication interface 1103 section includes one or more wired interfaces 1103*a* and/or one or more wireless interfaces 1103*b* for communicating over communication networks 109-115 via one or more of the aforementioned protocols or mediums. In a similar fashion, one or more sensor modules 1117*a*, 1117*b*, . . . , 1117*n* may be added to sensor 1100 via sensor interface 1117 section, such that each sensor module 1117*a*-1117*n* can share a same processing section and/or communication interface 1103 section. It is also contemplated that sensor modules 1117*a*-1117*n* may be provided to include their own one or more of processing sections and/or communication interface 1103 sections. In this illustrated embodiment; however, end-users may configure sensor 1100 to their specific needs and purposes by adding or subtracting one or more sensor modules 1117*a*-1117*n* for sensing various conditions or parameters, as well as by adding or subtracting one or more wired interface 1103*a* or wireless interface 1103*b* components via communication interface 1103 section. Thus, heterogeneous sensor may be custom-fit to the applications of an end-user.

It is further noted that authentication module 1101, controller 1105, memory 1107, notification module 1109, presence service module 1111, reporting module 1113, scheduling module 1115, and user interface module 1119 operate substantially equivalently to corresponding components within sensor monitoring platform 200. Therefore, these components will not be repetitively explained; however, merely noted that components 1101, 1105-1115, and 1119 comprise the processing section of sensor 1100.

The processes described herein for providing managed remote monitoring services may be implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 12:
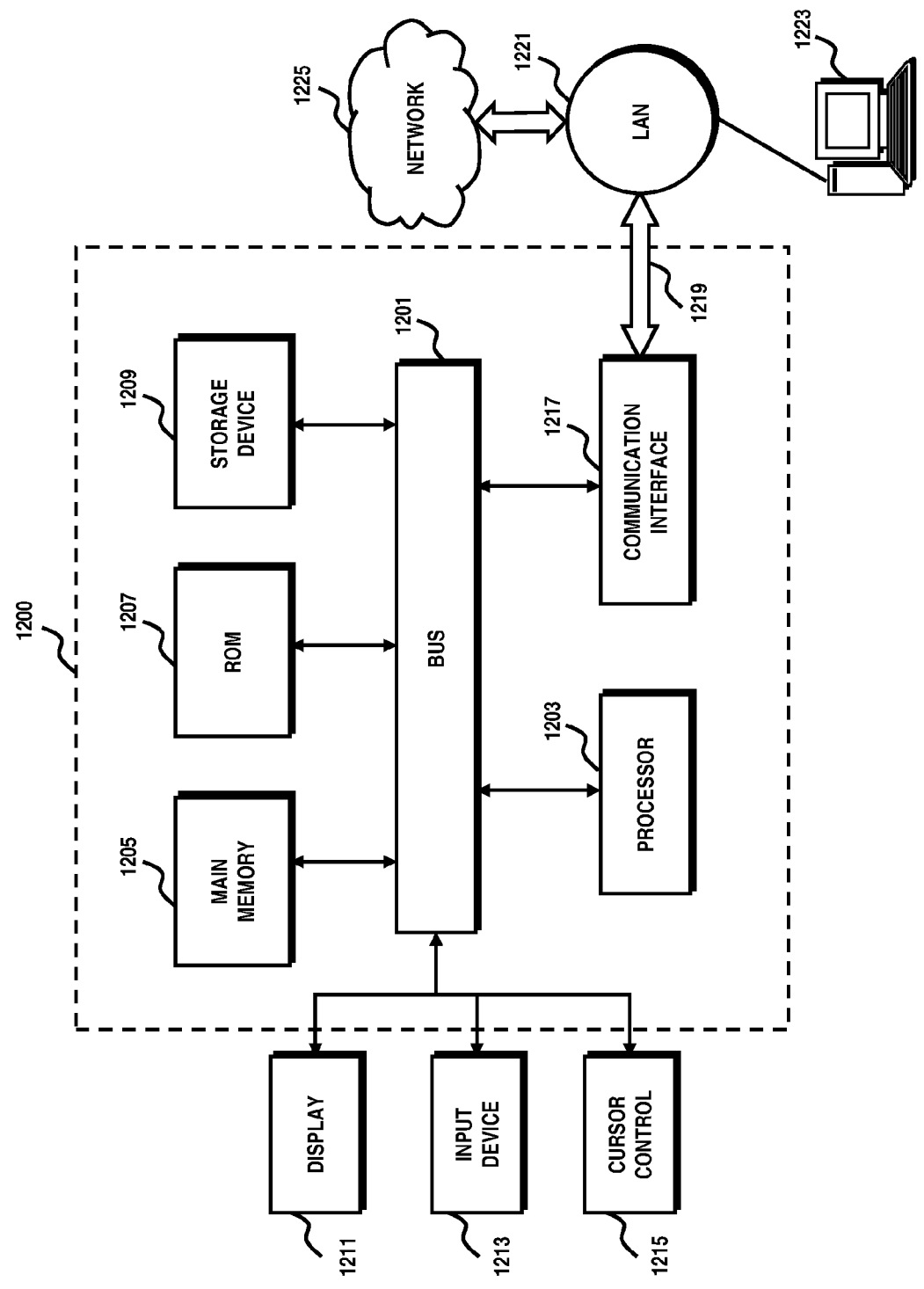
FIG. 12 is a diagram of a computer system that can be used to implement various exemplary embodiments.

FIG. 12 illustrates computing hardware (e.g., computer system) 1200 upon which an embodiment according to the invention can be implemented. The computer system 1200 includes a bus 1201 or other communication mechanism for communicating information and a processor 1203 coupled to the bus 1201 for processing information. The computer system 1200 also includes main memory 1205, such as a random access memory (RAM) or other dynamic storage device, coupled to the bus 1201 for storing information and instructions to be executed by the processor 1203. Main memory 1205 can also be used for storing temporary variables or other intermediate information during execution of instructions by the processor 1203. The computer system 1200 may further include a read only memory (ROM) 1207 or other static storage device coupled to the bus 1201 for storing static information and instructions for the processor 1203. A storage device 1209, such as a magnetic disk or optical disk, is coupled to the bus 1201 for persistently storing information and instructions.

The computer system 1200 may be coupled via the bus 1201 to a display 1211, such as a cathode ray tube (CRT), liquid crystal display, active matrix display, or plasma display, for displaying information to a computer user. An input device 1213, such as a keyboard including alphanumeric and other keys, is coupled to the bus 1201 for communicating information and command selections to the processor 1203. Another type of user input device is a cursor control 1215, such as a mouse, a trackball, or cursor direction keys, for communicating direction information and command selections to the processor 1203 and for controlling cursor movement on the display 1211.

According to an embodiment of the invention, the processes described herein are performed by the computer system 1200, in response to the processor 1203 executing an arrangement of instructions contained in main memory 1205. Such instructions can be read into main memory 1205 from another computer-readable medium, such as the storage device 1209. Execution of the arrangement of instructions contained in main memory 1205 causes the processor 1203 to perform the process steps described herein. One or more processors in a multi-processing arrangement may also be employed to execute the instructions contained in main memory 1205. In alternative embodiments, hard-wired circuitry may be used in place of or in combination with software instructions to implement the embodiment of the invention. Thus, embodiments of the invention are not limited to any specific combination of hardware circuitry and software.

The computer system 1200 also includes a communication interface 1217 coupled to bus 1201. The communication interface 1217 provides a two-way data communication coupling to a network link 1219 connected to a local network 1221. For example, the communication interface 1217 may be a digital subscriber line (DSL) card or modem, an integrated services digital network (ISDN) card, a cable modem, a telephone modem, or any other communication interface to provide a data communication connection to a corresponding type of communication line. As another example, communication interface 1217 may be a local area network (LAN) card (e.g. for Ethernet™ or an Asynchronous Transfer Model (ATM) network) to provide a data communication connection to a compatible LAN. Wireless links can also be implemented. In any such implementation, communication interface 1217 sends and receives electrical, electromagnetic, or optical signals that carry digital data streams representing various types of information. Further, the communication interface 1217 can include peripheral interface devices, such as a Universal Serial Bus (USB) interface, a PCMCIA (Personal Computer Memory Card International Association) interface, etc. Although a single communication interface 1217 is depicted in FIG. 12, multiple communication interfaces can also be employed.

The network link 1219 typically provides data communication through one or more networks to other data devices. For example, the network link 1219 may provide a connection through local network 1221 to a host computer 1223, which has connectivity to a network 1225 (e.g. a wide area network (WAN) or the global packet data communication network now commonly referred to as the "Internet") or to data equipment operated by a service provider. The local network 1221 and the network 1225 both use electrical, electromagnetic, or optical signals to convey information and instructions. The signals through the various networks and the signals on the network link 1219 and through the communication interface 1217, which communicate digital data with the computer system 1200, are exemplary forms of carrier waves bearing the information and instructions.

The computer system 1200 can send messages and receive data, including program code, through the network(s), the network link 1219, and the communication interface 1217. In the Internet example, a server (not shown) might transmit requested code belonging to an application program for implementing an embodiment of the invention through the network 1225, the local network 1221 and the communication interface 1217. The processor 1203 may execute the transmitted code while being received and/or store the code in the storage device 1209, or other non-volatile storage for later execution. In this manner, the computer system 1200 may obtain application code in the form of a carrier wave.

The term "computer-readable medium" as used herein refers to any medium that participates in providing instructions to the processor 1203 for execution. Such a medium may take many forms, including but not limited to non-volatile media, volatile media, and transmission media. Non-volatile media include, for example, optical or magnetic disks, such as the storage device 1209. Volatile media include dynamic memory, such as main memory 1205. Transmission media include coaxial cables, copper wire and fiber optics, including the wires that comprise the bus 1201. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

Various forms of computer-readable media may be involved in providing instructions to a processor for execution. For example, the instructions for carrying out at least part of the embodiments of the invention may initially be borne on a magnetic disk of a remote computer. In such a scenario, the remote computer loads the instructions into main memory and sends the instructions over a telephone line using a modem. A modem of a local computer system receives the data on the telephone line and uses an infrared transmitter to convert the data to an infrared signal and transmit the infrared signal to a portable computing device, such as a personal digital assistant (PDA) or a laptop. An infrared detector on the portable computing device receives the information and instructions borne by the infrared signal and places the data on a bus. The bus conveys the data to main memory, from which a processor retrieves and executes the instructions. The instructions received by main memory can optionally be stored on storage device either before or after execution by processor.

While certain exemplary embodiments and implementations have been described herein, other embodiments and modifications will be apparent from this description. Accordingly, the invention is not limited to such embodiments, but rather to the broader scope of the presented claims and various obvious modifications and equivalent arrangements.

What is claimed is:

1. A method comprising:
   receiving a plurality of signals over a communications network from, respectively, a plurality of heterogeneous sensors, and generating sensor data for each of the respective sensors in response to the received signals;
   establishing a plurality of instant communication sessions, each corresponding to a respective one of the plurality of heterogeneous sensors; and
   communicating, over each of the instant communication sessions, a presence of the respective sensor, wherein the presence indicates the respective sensor data.

2. A method according to claim 1, further comprising:
   storing the sensor data in a repository that is accessible via the communications network.

3. A method according to claim 2, wherein the sensor data is transmitted to an end-user device that includes either a multimedia device, a wireless terminal, a mobile terminal, a personal computer, or a portable computer.

4. A method according to claim 1, further comprising:
receiving a report request, from an end user device, to generate a report based on the sensor data; and
generating the report for transmission to the end user device in response to the report request.

5. A method according to claim 4, wherein the sensor data includes real-time data, historical data, or a combination thereof.

6. A method according to claim 4, wherein the report request includes a criterion for the report generation.

7. A method according to claim 1, further comprising:
generating a notification for alerting an end user about the sensor data.

8. A method according to claim 1, further comprising:
correlating the sensor data based on a criteria specified by an end user.

9. A method according to claim 1, wherein the communicated presence of each of the sensors comprises rich presence data.

10. An apparatus comprising:
a communication interface configured to establish a plurality of instant communication sessions, each corresponding to a respective one of a plurality of heterogeneous sensors, and to receive a plurality of signals from, respectively, the plurality of sensors; and
a processor configured to generate sensor data for each of the respective sensors in response to the received signals, and to communicate, over each of the instant communication sessions, a presence of the respective sensor, wherein the presence indicates the respective sensor data.

11. An apparatus according to claim 10, wherein the sensor data is stored in a repository.

12. An apparatus according to claim 11, wherein the sensor data is transmitted to an end user device that includes a multimedia device, a wireless terminal, a mobile terminal, a personal computer, or a portable computer.

13. An apparatus according to claim 10, wherein the communication interface is further configured to receive a report request from an end user device, and the processor is further configured to, in response to the report request, generate a report based on the sensor data for transmission to the end user device.

14. An apparatus according to claim 13, wherein the sensor data includes real-time data, historical data, or a combination thereof.

15. An apparatus according to claim 13, wherein the report includes a criterion for the report generation.

16. An apparatus according to claim 10, wherein the processor is further configured to generate a notification for alerting an end user about the sensor data.

17. An apparatus according to claim 10, wherein the processor is further configured to correlate the sensor data based on a criteria specified by an end user.

18. An apparatus according to claim 10, wherein the communicated presence of each of the sensors comprises rich presence data.

19. A method comprising:
establishing a plurality of instant communication sessions, each corresponding with a respective one of a plurality of heterogeneous sensors; and
receiving, via each of the instant communication sessions, a presence communication for the respective sensor,
wherein each presence communication indicates sensor data associated the respective heterogeneous sensor.

20. A method according to claim 19, further comprising:
receiving a notification for alerting an end user about the sensor data,
wherein the notification is generated based on criteria stored to a user profile associated with the end user.

21. A method according to claim 19, wherein an online interface is provided over the communications network to enable the end user to interact with the particular heterogeneous sensor.

22. A method according to claim 21, wherein the online interface is provided by the particular heterogeneous sensor or a networked application.

23. A method according to claim 19, wherein presence of each of the heterogeneous sensors includes rich presence.

* * * * *